United States Patent
Torvi et al.

(10) Patent No.: US 9,363,169 B2
(45) Date of Patent: Jun. 7, 2016

(54) APPARATUS, SYSTEM, AND METHOD FOR RECONFIGURING POINT-TO-MULTIPOINT LABEL-SWITCHED PATHS

(71) Applicant: Juniper Networks, Inc., Sunnyvale, CA (US)

(72) Inventors: Raveendra Torvi, Nashua, NH (US); Vishnu Pavan Beeram, Ashburn, VA (US); Maruthi Kishore Tiruveedhula, Nashua, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 143 days.

(21) Appl. No.: 14/231,117

(22) Filed: Mar. 31, 2014

(65) Prior Publication Data

US 2015/0281045 A1  Oct. 1, 2015

(51) Int. Cl.
*H04L 12/703* (2013.01)
*H04L 12/911* (2013.01)
*H04L 12/751* (2013.01)
*H04L 12/723* (2013.01)

(52) U.S. Cl.
CPC ............... *H04L 45/28* (2013.01); *H04L 45/02* (2013.01); *H04L 45/50* (2013.01); *H04L 47/825* (2013.01)

(58) Field of Classification Search
CPC ....... H04L 45/28; H04L 47/825; H04L 45/50; H04L 45/02
See application file for complete search history.

(56) References Cited

U.S. PATENT DOCUMENTS

| | | | |
|---|---|---|---|
| 2005/0138476 A1* | 6/2005 | Taylor | H04L 41/0659 714/37 |
| 2007/0248016 A1* | 10/2007 | Ashwood Smith | H04L 12/66 370/238 |
| 2008/0107018 A1* | 5/2008 | Zhang | H04L 12/1877 370/228 |
| 2010/0124196 A1* | 5/2010 | Bonar | H04B 7/0689 370/329 |
| 2012/0033542 A1 | 2/2012 | Hanif et al. | |
| 2013/0089100 A1 | 4/2013 | Zhao et al. | |
| 2013/0279320 A1* | 10/2013 | Cheng | H04L 45/22 370/218 |
| 2014/0003229 A1 | 1/2014 | Gandhi et al. | |
| 2014/0204954 A1* | 7/2014 | Nee | H04L 47/2441 370/401 |
| 2014/0254352 A1* | 9/2014 | Natarajan | H04L 45/28 370/228 |
| 2014/0279136 A1* | 9/2014 | Pacella | H04L 41/5029 705/26.3 |

OTHER PUBLICATIONS

Rosen, E. et al., "Multiprotocol Label Switching Architecture", Request for Comments (RFC) 3031, Internet Engineering Task Force (IETF), (Jan. 2001).

(Continued)

*Primary Examiner* — Brian D Nguyen
(74) *Attorney, Agent, or Firm* — ALG Intellectual Property, LLC

(57) ABSTRACT

An apparatus may include a processor and a control plane that directs the processor to (1) detect that at least a portion of an initial branch path of a point-to-multipoint label-switched path has failed over to a failover route that rejoins the initial branch path at a merge-point device and (2) establish an alternate branch path that merges with the initial branch path at the merge-point device. The apparatus may also include a network interface and a data plane that uses the network interface to transmit data via the alternate branch path while data is still being transmitted via the initial branch path, where after the data plane begins transmitting data via the alternate branch path, the control plane instructs the merge-point device to forward data from the alternate branch path rather than from the failover route. Various other apparatuses, systems, and methods are also disclosed.

20 Claims, 7 Drawing Sheets

(56) References Cited

OTHER PUBLICATIONS

Braden, R. et al., "Resource ReSerVation Protocol (RSVP)", Request for Comments (RFC) 2205, Internet Engineering Task Force (IETF), (Sep. 1997).

Berger, L. et al., "Generalized Multi-Protocol Label Switching (GMPLS) Signaling Resource ReserVation Protocol-Traffic Engineering (RSVP-TE) Extensions", Request for Comments (RFC) 3473, Internet Engineering Task Force (IETF), (Jan. 2003).

Pan, P. et al., "Fast Reroute Extensions to RSVP-TE for LSP Tunnels", Request for Comments (RFC) 4090, Internet Engineering Task Force (IETF), (May 2005).

Aggarwal, R. et al., "Extensions to Resource Reservation Protocol—Traffic Engineering (RSVP-TE) for Point-to-Multipoint TE Label Switched Paths (LSPs)", Request for Comments (RFC) 4875, Internet Engineering Task Force (IETF), (May 2007).

Awduche, D. et al., "RSVP-TE: Extensions to RSVP for LSP Tunnels", Request for Comments (RFC) 3209, Internet Engineering Task Force (IETF), (Dec. 2001).

Yasukawa, S. et al., "Signaling Requirements for Point-to-Multipoint Traffic-Engineered MPLS Label Switched Paths (LSPs)", Request for Comments (RFC) 4461, Internet Engineering Task Force (IETF), (Apr. 2006).

"Understanding the RSVP Signaling Protocol", http://www.juniper.net/techpubs/en_US/junos12.1/topics/concept/mpls-security-rsvp-signaling-protocol-understanding.html, as accessed Feb. 10, 2014, Juniper Networks, Inc., (Oct. 5, 2012).

"MPLS Concepts", Cisco Systems, Inc., (2002).

Neate, Nic "RSVP-TE Point-to-Multipoint", Metaswitch Networks, (Mar. 2009).

"Multiprotocol Label Switching", http://en.wikipedia.org/wiki/Multiprotocol_Label_Switching, as accessed Feb. 10, 2014, Wikipedia, (Jan. 5, 2005).

"Resource Reservation Protocol", http://en.wikipedia.org/wiki/Resource_Reservation_Protocol, as accessed Feb. 10, 2014, Wikipedia, (Feb. 20, 2005).

"Understanding the RSVP Signaling Protocol", http://www.juniper.net/techpubs/software/junos-security/junos-security10.2/junos-security-swconfig-mpls/topic-47252.html, as accessed Feb. 10, 2014, Juniper Networks, Inc.

"Implementing MPLS Traffic Engineering", http://www.cisco.com/c/en/us/td/docs/routers/crs/software/crs_r4-1/mpls/configurationguideb_mpls_cg41crsb_mpls_cg41crs_chapter_0100.html, as accessed Feb. 10, 2014, Cisco IOS XR MPLS Configuration Guide for the Cisco CRS Router, Release 4.1, Cisco Systems, Inc., (2013).

Zhao, Quintin et al., "P2MP Based mLDP Node Protection Mechanisms for Label Distribution Protocol P2MP Label Switched Paths", IETF, (Oct. 22, 2012).

\* cited by examiner

APPARATUS, SYSTEM, AND METHOD FOR RECONFIGURING POINT-TO-MULTIPOINT LABEL-SWITCHED PATHS

BACKGROUND

The increasing demand for Internet-based video and Internet-protocol television (IPTV) has driven the need for efficient and robust networking systems. To meet the bandwidth and quality-of-service (QoS) demands of broadcasting video over the Internet, network developers often rely on multicasting technologies. One particularly useful network technology for simultaneously broadcasting video to a number of consumers is the point-to-multipoint (P2MP) extension of the resource reservation traffic engineering (RSVP-TE) protocol.

P2MP RSVP-TE provides a number of features that are useful in Internet video distribution and IPTV. For example, P2MP RSVP-TE may guarantee QoS through resource reservation, and P2MP RSVP-TE label-switched paths (LSPs) may be explicitly routed for optimal resource usage. Furthermore, P2MP RSVP-TE provides various resilience procedures, such as global repair.

Unfortunately, P2MP RSVP-TE global repair typically involves re-signaling every branch in a P2MP tree, which may place a significant load on an ingress router that is coordinating the global repair. As a result, P2MP LSPs may not utilize many of the features available to point-to-point (P2P) LSPs, such as auto-bandwidth adjustment and secondary LSP provisioning. Furthermore, the global repair procedures of RSVP-TE may make a fast reroute (FRR) event for P2MP LSPs much more expensive than an FRR event for P2P LSPs. What is needed, therefore, is a more efficient and effective mechanism for reconfiguring P2MP LSP trees.

SUMMARY

As will be described in greater detail below, the instant disclosure generally relates to apparatuses, systems, and methods for reconfiguring label-switched paths. In one example, a method for accomplishing such a task may include (1) detecting that at least a portion of an initial branch path of a point-to-multipoint label-switched path has failed over to a failover route that rejoins the initial branch path at a merge-point device, (2) establishing an alternate branch path that merges with the initial branch path at the merge-point device, (3) transmitting data via the alternate branch path while data is still being transmitted via the initial branch path, and (4) instructing the merge-point device to forward data from the alternate branch path rather than from the failover route.

Similarly, an apparatus for reconfiguring label-switched paths may include a processor and a control plane that directs the processor to detect that at least a portion of an initial branch path of a point-to-multipoint label-switched path has failed over to a failover route that rejoins the initial branch path at a merge-point device. The control plane may also direct the processor to establish an alternate branch path that merges with the initial branch path at the merge-point device. In additional to the control plane, the apparatus may include a data plane that uses the network interface to transmit data via the alternate branch path while data is still being transmitted via the initial branch path, and the control plane may instruct the merge-point device to forward data from the alternate branch path rather than from the failover route after the data plane begins transmitting data via the alternate path.

A corresponding system may include a rerouting-control device with a control plane that detects that at least a portion of an initial branch path of a point-to-multipoint label-switched path has failed over to a failover route that rejoins the initial branch path at a merge-point device. The control plane of the rerouting-control device may also establish an alternate branch path that merges with the initial branch path at the merge-point device. In addition to the control plane, the rerouting-control device may include a data plane that transmits data via the alternate branch path while data is still being transmitted via the initial branch path. The control plane may, after the data plane begins transmitting data via the alternate branch path, send a signal that instructs the merge-point device to forward data from the alternate branch path rather than from the failover route.

The system may also include a merge-point device with a control plane that receives the signal from the rerouting-control device and a data plane that, in response to the signal from the rerouting-control device, forwards data from the alternate branch path and drops data from the failover route.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
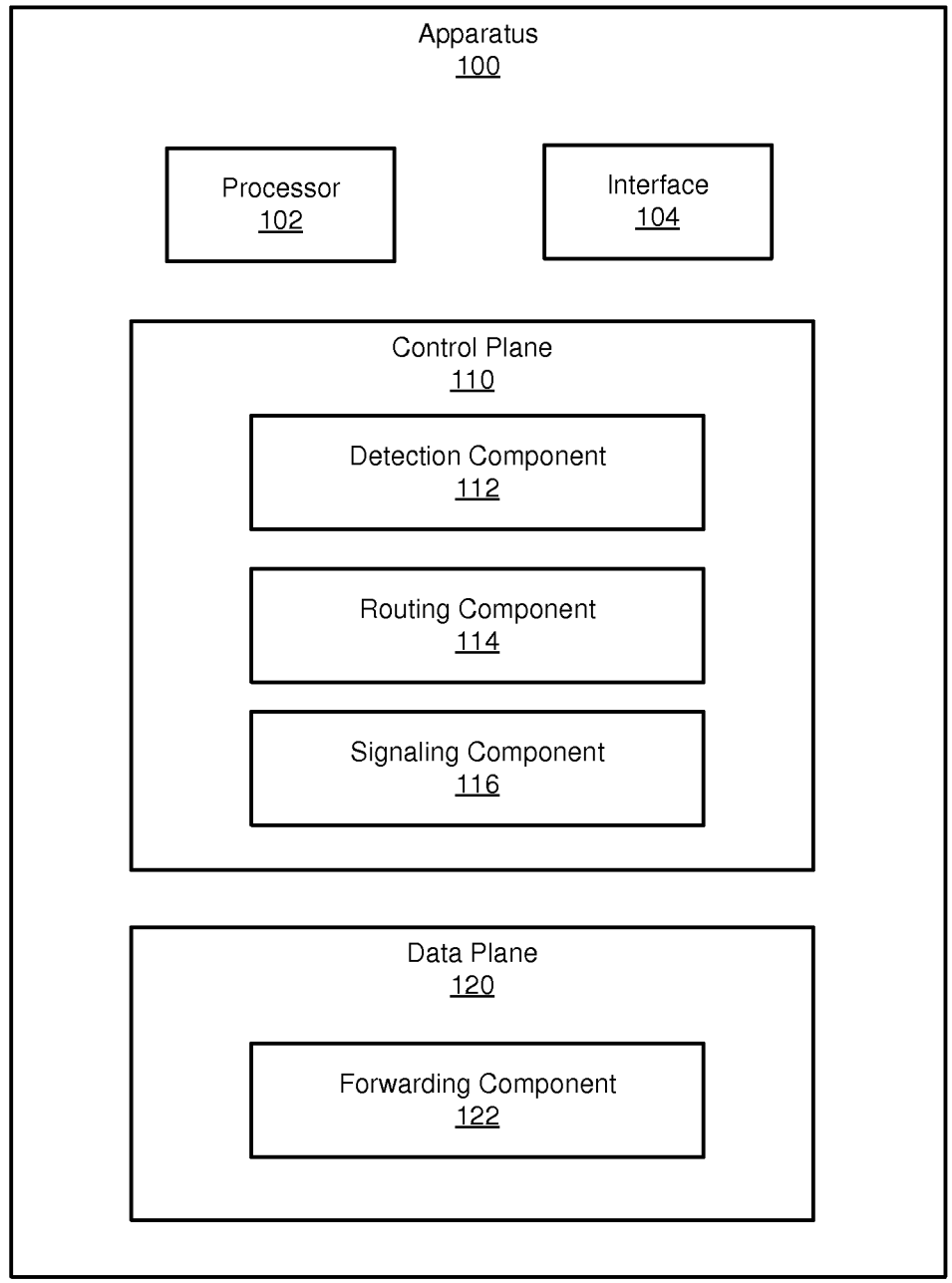
FIG. 1 is a block diagram of an exemplary apparatus for reconfiguring label-switched paths.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for reconfiguring label-switched paths. As will be explained in greater detail below, embodiments described herein may enable reconfiguration of a subset of P2MP LSPs in a P2MP tree of an MPLS network. For example, in the event of a topology change (e.g., a link or node failure) in an MPLS network, an ingress router may only re-signal branch LSPs that are affected by the topology change. The ingress router may then begin sending traffic on the new branch LSPs and may signal a merge-point router to perform a lossless switchover from the old branch LSPs to the new branch LSPs.

The signaling procedures and other examples described herein may provide a number of advantages. For example, the load on an ingress router may be reduced when the ingress router responds to a topology-change event by only re-signaling branch LSPs in a P2MP tree that are affected by the topology-change event (instead of re-signaling every branch of the tree, whether or not they are affected by the topology-change event). The signaling procedures described herein may also enable and/or allow P2MP LSPs to use various features (e.g., auto bandwidth adjustment, secondary path signaling, etc.) that are typically only used with P2P LSPs. The apparatuses, systems, and methods described herein may also provide various additional and/or alternative advantages and features.

Figure 2:
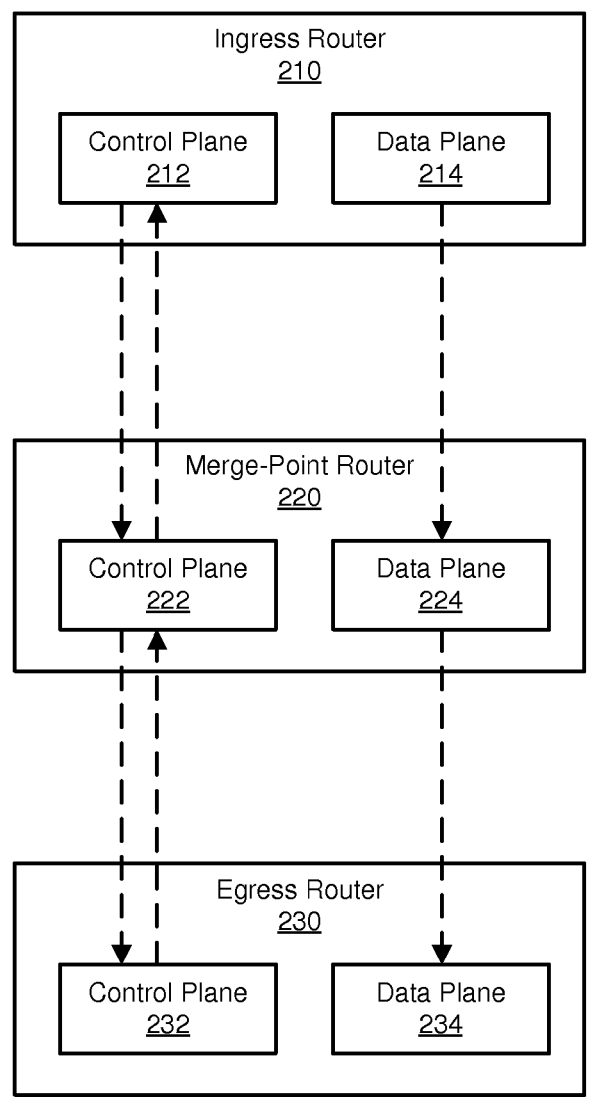
FIG. 2 is a block diagram of an exemplary system for reconfiguring label-switched paths.
Figure 3:
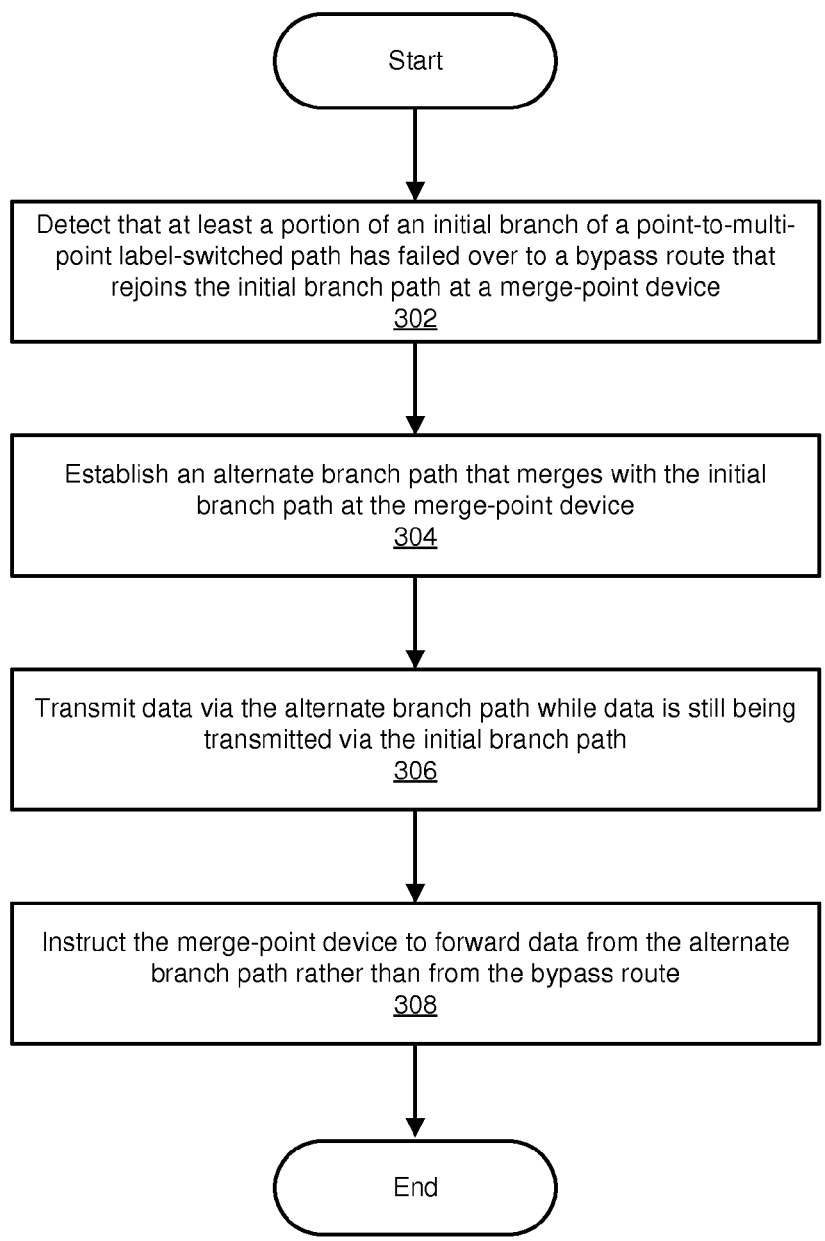
FIG. 3 is a flow diagram of an exemplary method for reconfiguring label-switched paths.
Figure 4:
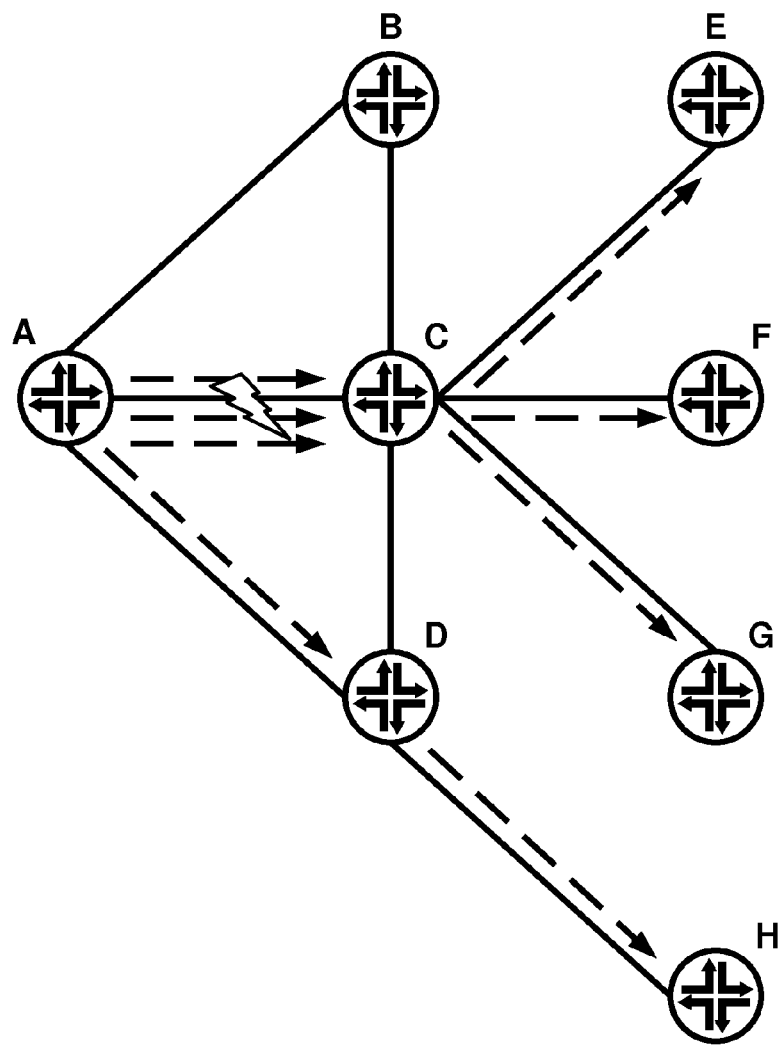
FIG. 4 is a block diagram of an exemplary multi-protocol label-switched (MPLS) network.
Figure 5:
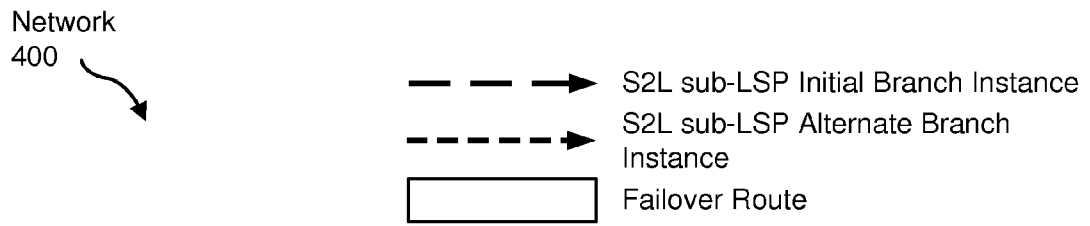
FIG. 5 is a block diagram of the exemplary MPLS network of FIG. 4 after the MPLS network has performed failover and reconfiguration operations.
Figure 5:
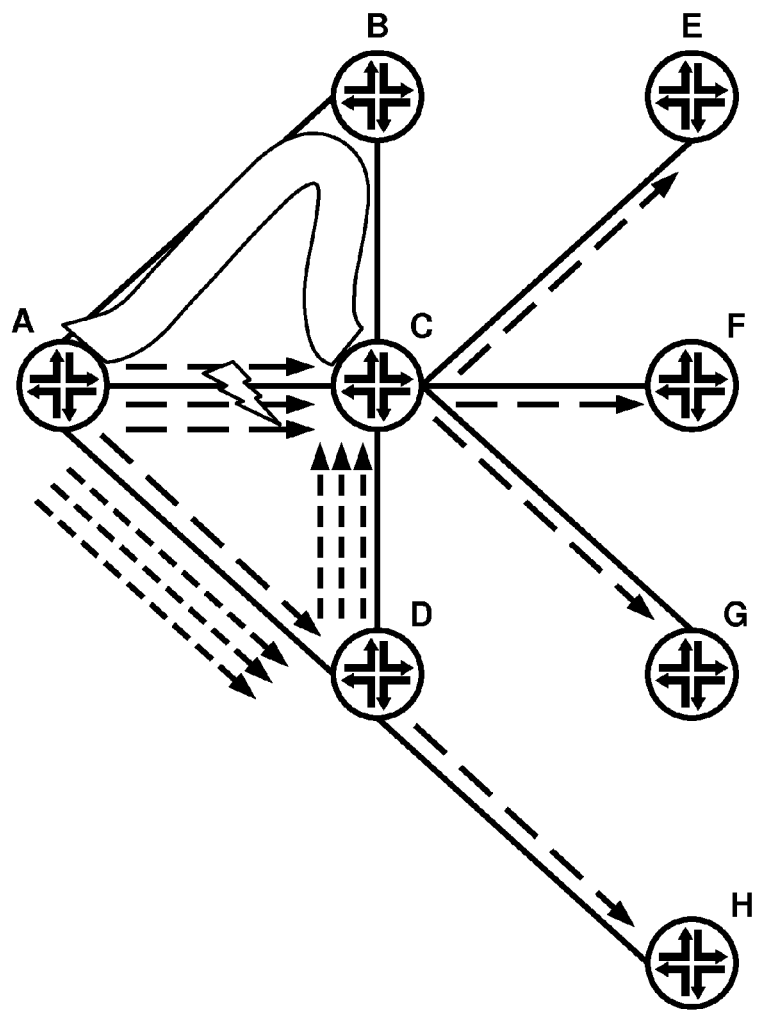
Figure 6:
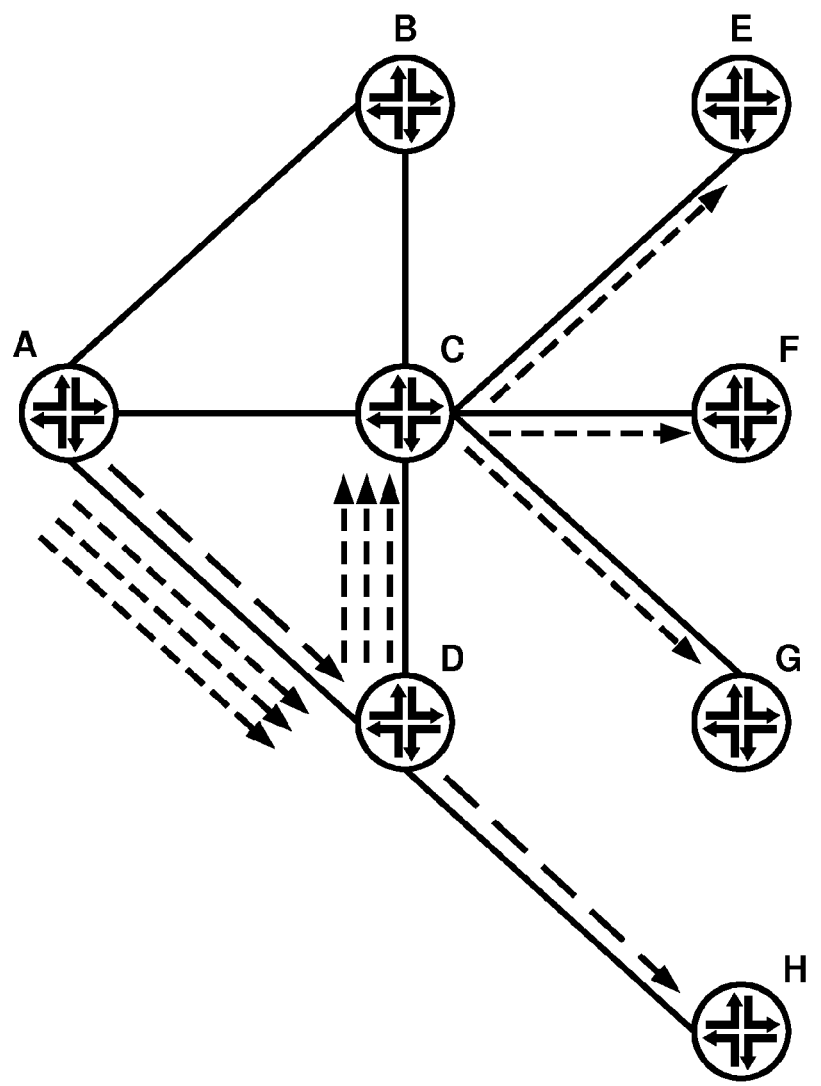
FIG. 6 is a block diagram of the exemplary MPLS network of FIG. 4 after the MPLS network has performed teardown operations.

The following will provide, with reference to FIGS. 1 and 2, examples of apparatuses and systems for reconfiguring label-switched paths, and the discussion corresponding to FIG. 3 will provide examples of methods for reconfiguring label-switched paths. In addition, the disclosure associated with FIGS. 4-6 provides examples of how the embodiments described herein handle topology-change events in a network. Finally, the discussion corresponding to FIG. 7 will provide numerous examples of systems that may include the components, systems, and devices shown in FIGS. 1 and 2.

FIG. 1 is a block diagram of an exemplary apparatus 100 for reconfiguring label-switched paths. Apparatus 100 generally represents any type or form of networking device capable of performing routing and/or switching functions. For example, apparatus 100 may include a routing device, a switching device, and/or a rerouting-control device. A rerouting-control device may be any device (e.g., router, switch, control system, etc.) capable of performing the functions of detection component 112, routing component 114, and/or signaling component 116.

Apparatus 100 may function as any type of LSP node, including a head-end node (e.g., an ingress device, such as an ingress router), a tail-end node (e.g., an egress device, such as an egress router), and/or an intermediate node (e.g., a merge-point node or other label switching router (LSR)). Ingress devices and egress devices may also be referred to as label edge devices or label edge routers (LERs).

As shown in FIG. 1, apparatus 100 may include a processor 102, an interface 104, a control plane 110, and a data plane 120. Control plane 110 may include a detection component 112 that directs processor 102 to detect that that at least a portion of an initial branch path of a point-to-multipoint label-switched path has failed over to a failover route that rejoins the initial branch path at a merge-point device. Control plane 110 may also include a routing component 114 that directs processor 102 to establish an alternate branch path that merges with the initial branch path at the merge-point device. Data plane 120 may include a forwarding component 122 that uses interface 104 to transmit data via the alternate branch path while data is still being transmitted via the initial branch path. In addition, and as will be described in greater detail below, control plane 110 may include a signaling component 116 that may instruct the merge-point device to forward data from the alternate branch path rather than from the failover route.

The terms "data plane," "forwarding component," and/or "forwarding plane" generally refer to any hardware (e.g., processor 102), software construct (e.g., forwarding component 122), protocol, interface (e.g., interface 104), forwarding table (e.g., a label forwarding table), forwarding engine, and/or connection that transfers data between nodes in a network.

The terms "control plane," "detection component," "routing component," and "signaling component" generally refer to any hardware (e.g., processor 102), software construct, protocol, interface (e.g., interface 104), routing table, and/or connection involved in the management and/or control of data flow (e.g., routing of packets) within a computing network. A control plane of an LSR may use any type or form of routing algorithm or protocol, such as a multiprotocol label switching (MPLS) algorithm (e.g., tag distribution protocol (TDP), label distribution protocol (LDP), resource reservation protocol (RSVP), etc.). While some of the examples presented in this disclosure focus on RSVP, principles of the instant disclosure may be implemented with any other suitable protocol.

A description of MPLS may be found in E. Rosen, et al., "Multiprotocol Label Switching Architecture," Request For Comments (RFC) 3031, January 2001, available from the Internet Engineering Task Force (IETF), the content of which is incorporated by reference in its entirety as though fully set forth herein. A description of RSVP may be found in R. Braden, et al., "Resource ReSerVation Protocol (RSVP)," RFC 2205, September 1997, available from the IETF, the content of which is incorporated by reference in its entirety as though fully set forth herein. Additional discussion of MPLS and RSVP may be found in L. Berger, et al., "Generalized Multi-Protocol Label Switching (GMPLS) Signaling Resource ReSerVation Protocol-Traffic Engineering (RSVP-TE) Extensions," RFC 3473, January 2003, available from the IETF, the content of which is incorporated by reference in its entirety as though fully set forth herein.

Returning to FIG. 1, processor 102 and interface 104 of apparatus 100 may be used by control plane 110 and/or data plane 120 to perform various networking functions, as discussed above. Processor 102 generally represents any type or form of general-purpose and/or special-purpose processor, such as processor 714 shown in FIG. 7. Interface 104 generally represents any type of hardware and/or software interface (e.g., communication interface 722) for sending and/or receiving data and/or control signals to and from other devices. While FIG. 1 shows that apparatus 100 includes a single processor 102 and a single interface 104, apparatus 104 may include any other suitable number of processors and/or interfaces.

Apparatus 100 may be implemented in a variety of different contexts. For example, instances of apparatus 100 may be implemented in system 200 of FIG. 2 as an ingress router 210, a merge-point router 220, and an egress router 230. System 200 represents an example of the label-edge devices (i.e., ingress router 210 and egress router 230) and an intermediate device (e.g., merge-point router 220) that may be involved in signaling and control of one or more aspects of reconfiguring an LSP. While FIG. 2 shows an example with three devices, embodiments of the instant disclosure may be implemented in systems and networks with any number of label-edge devices and/or intermediate devices.

As shown in FIG. 2, ingress router 210 may include a control plane 212 and a data plane 214. Control plane 212 of ingress router 210 may communicate (either directly via a link or indirectly via one or more additional devices) with a control plane 222 of merge-point router 220. Similarly, control plane 222 of merge-point router 220 may communicate directly or indirectly with a control plane 232 of egress router 230, and control plane 212 of ingress router 210 may communicate indirectly with control plane 232 of egress router 230. Control planes 212, 222, and 232 may control the routing of data via a data plane 214 of ingress router 210, a data plane 224 of merge-point router 220, and a data plane 234 of egress router 230.

One or more components of control plane 212 in ingress router 210 may detect that that at least a portion of an initial branch path of a P2MP LSP has failed over to a failover route that rejoins the initial branch path at merge-point router 220. As used herein, the term "initial branch" generally refers to any branch of a P2MP tree that exists at the time of a topology-change event or failover, the term "branch" refers to any sub-LSP of a P2MP tree (branches of P2MP trees may also be referred to as source-to-leaf (S2L) sub-LSPs), and the term "P2MP" generally refers to any suitable multicast routing scheme. Furthermore, the term "portion of a branch path" generally refers to one or more segments (e.g., portions of a path between two nodes) or sections of a branch path.

As mentioned, control plane 212 of ingress router 210 may detect a branch path failover to a failover route. The term "failover" generally refers to any switch from a primary branch path (e.g., an initial branch path) to a route that bypasses at least a portion of the primary branch path. Similarly, the term "failover route" generally refers to any redundant or standby path, route, and/or tunnel (e.g., a bypass tunnel, a backup tunnel, a nexthop (NHOP) bypass tunnel, a next-nexthop (NNHOP) bypass tunnel, etc.). Failover may be performed using MPLS local restoration or protection procedures, such as a facility (i.e., bypass) fast reroute (FRR) procedure, a one-to-one (i.e., detour) fast reroute procedure, a secondary LSP recovery, and/or using any other suitable high-availability or redundancy mechanism. A description of FRR may be found in P. Pan, et al., "Fast Reroute Extensions to RSVP-TE for LSP Tunnels," RFC 4090, May 2005, available from the IETF, the content of which is incorporated by reference in its entirety as though fully set forth herein.

After detecting the failover, control plane 212 of ingress router 210 may also establish an alternate branch path that merges with the initial branch path at merge-point router 220. For example, control plane 212 of ingress router 210 may signal merge-point router 220 to create and/or use a wild-card interface or filter that shares a single reservation with both the initial branch path and the alternate branch path.

The term "merge point" generally refers to any network node where a backup LSP merges with a primary LSP and/or where an initial primary branch LSP merges with an alternate primary branch LSP. In some examples (e.g., in bypass FRRs), a merge-point node may be any node located downstream from a protected facility (e.g., a link or node that has failed, that has gone offline, on which maintenance is being performed, etc.). In other examples (e.g., in facility FRRs), a merge-point node may be a node that is immediately downstream from a protected facility.

Once an alternate branch path has been established, data plane 214 of ingress router 210 may begin transmitting data via the alternate branch path. Ingress router 210 may also continue to transmit data via the initial branch path that failed over to the failover route such that data from both the failover route and the alternate branch path arrive at merge-point router 220. At this point, merge-point router 220 may forward data received from the failover route (i.e., the data that is traversing the initial branch path) and may drop data received from the alternate branch path.

When data is being transmitted via the alternate branch path, control plane 212 of ingress router 210 may send a signal to control plane 222 of merge-point router 220 that instructs merge-point router 220 to forward data from the alternate branch path rather than from the failover route. In response to the signal, control plane 222 of merge-point router 220 may modify data plane 224 to cause data plane 224 to forward data from the alternate branch path and drop data from the failover route.

Control plane 222 of merge-point router 220 may handle switching from forwarding data from the failover route to forwarding data from the alternate branch path in a single, atomic operation such that no data is dropped during the switch. For example, control plane 222 may change a single parameter (e.g., a single bit) of a data structure in data plane 224 to cause two simultaneous events to occur: (1) begin forwarding traffic from the alternate branch path and (2) begin dropping data from the failover route.

Switchover may be implemented by having a first label data structure for the initial path and a second label data structure for the second path. Both data structures may point to a reverse-path forwarding (RPF) data structure of data plane 224 that points to a downstream next hop. Before the switchover occurs, the RPF data structure of data plane 224 may indicate that a label associated with the failover route (e.g., label 1 representing the initial branch path) is a primary label for which data is to be forwarded. The RPF data structure may also indicate that a label associated with the alternate branch path (e.g., label 2 representing the alternate branch path) is a backup label for which data is to be dropped. Thus, the RPF next hop data structure in data plane 224 may indicate the following:

label_1, primary
label_2, backup

After control plane 222 of merge-point router 220 triggers data plane 224 to switch to forwarding traffic from the alternate branch path by modifying the RPF data structure, the RPF data structure may indicate that the label associated with the alternate branch path is a primary label for which data is to be forwarded and that the label associated with the failover route is a backup label for which data is to be dropped. At this point, the RPF next hop data structure in data plane 224 may indicate the following:

label_1, backup
label_2, primary

Thus, merge-point router 220 may switchover from forwarding traffic of the initial branch path to forwarding traffic of the alternate branch path in a single operation such that no data is dropped and QoS is maintained. After the switchover has been made, control plane 212 of ingress router 210 may signal teardown of the initial branch path. Control plane 232 of egress router 230 may receive the teardown signal and may, in response, send an upstream message that triggers, for each node in the initial branch path, removal of signaling state for the initial branch path.

The functionality and configuration of system 200 may be implemented in a variety of contexts (e.g., in various different networks, using various methods, etc.). FIG. 3 is a flow diagram of a method showing the functionality of one or more of the components of system 200, and FIGS. 4-6 show an exemplary network in which the functionality of system 200 may be implemented.

As shown in step 302 in FIG. 3, one or more of the systems and/or apparatuses described herein (e.g., apparatus 100, ingress router 210, and/or computing system 700) may detect that an initial branch of a P2MP tree has failed over to a failover route that rejoins the initial branch path at a merge-point device. For example, ingress router 210 may determine that all or a portion of an S2L sub-LSP of a P2MP tree has failed over and been rerouted around one or more protected nodes and/or links. In the example shown in FIG. 4, node A, which may be an ingress router, may detect failure of the link between nodes A and C and/or may detect that the LSPs using the link between A and C have failed over to the failover route shown in FIG. 5. In this example, node A may detect that three branch paths have been affected by the failure. In other examples, an ingress device may detect that one, two, or any other number of branch paths have been affected by a failure.

As shown in FIG. 4, at the time of the failure of the link between nodes A and C, network 400 may have a P2MP tree with four S2L sub-LSPs from node A to nodes E, F, G, and H:

S2L sub-LSP-E: A, C, E; Branch-ID 1
S2L sub-LSP-F: A, C, F; Branch-ID 2
S2L sub-LSP-G: A, C, G; Branch-ID 3
S2L sub-LSP-H: A, D, H; Branch-ID 4

Ingress router 210 may determine that a portion of a branch path has failed over in a variety of ways. Ingress router 210 may determine that a branch path has failed over when ingress router 210 receives a signal indicating that an FRR operation or other resiliency operation has been performed, when ingress router 210 receives a signal about network reconfiguration, error, and/or failure, and/or in response to any other type of trigger. For example, ingress router 210 may receive an error message (e.g., a PathErr message with an error code of "notify") from a point of local repair (e.g., a node that detects a failure and/or that handles a local repair operation for the failure, such as a headend of a bypass or backup tunnel). In addition to or instead of receiving an error message, ingress router 210 may detect or infer a topology-change condition based on behavior of one or more LSPs. For example, ingress router 210 may detect that an LSP has to move to a more optimal path by noticing failures reported via an interior gateway protocol (IGP). In other examples, such as the example shown in FIG. 5, an ingress router (e.g., node A) may, as a point of local repair, determine that an S2L sub-LSP has failed over by directly detecting the failure and/or by participating in the local repair procedure.

Failover of an S2L branch may occur in response to any type or form of topology-change event. For example, an S2L branch may failover to a failover route in response to a link or node failure, in response to network reconfiguration, re-optimization, and/or maintenance, and/or in response to any other event that may necessitate rerouting traffic. In the example shown in FIG. 4, in response to the failure of the link between nodes A and C, the A-C segment of S2L sub-LSP-E, S2L sub-LSP-F, and S2L sub-LSP-G may be rerouted through a bypass tunnel that routes traffic from node A to node C through node B.

Returning to FIG. 3, after detecting that a portion of the initial branch path has failed over to a failover route, one or more of the systems and/or apparatuses described herein may establish an alternate branch path that merges with the initial branch path at the merge-point device. For example, ingress router 210 (e.g., node A in FIGS. 4-6) may establish an alternate branch path (e.g., a path from node A to node D to node C, as shown in FIG. 5) for one or more initial branch paths affected by a failover.

Ingress router 210 may establish one or more alternate branch paths in any suitable manner. For example, ingress router 210 may establish an alternate branch path by calculating the alternate branch path and/or the signaling the branch path.

Ingress router 210 may use any suitable algorithm or heuristic to calculate an alternate branch path. For example, ingress router 210 may use one or more traffic engineering parameters to re-optimize the branch path (i.e., to re-calculate an optimal branch path). Examples of traffic engineering parameters may include, but are not limited to, traffic parameter attributes (e.g., peak rates, average rates, permissible burst sizes, bandwidth requirements, etc.), forwarding equivalence classes, generic path selection and maintenance attributes, priority attributes (e.g., the relative importance of a traffic stream), preemption attributes (e.g., whether some traffic is allowed to preempt other traffic), resilience attributes (e.g., attributes that indicate recovery procedures), and/or policing attributes (e.g., attributes that indicate when a traffic stream becomes non-compliant).

A discussion of traffic engineering for P2MP LSPs can be found in R. Aggarwal, et al., "Extensions to Resource Reservation Protocol—Traffic Engineering (RSVP-TE) for Point-to-Multipoint TE Label Switched Paths (LSPs)," RFC 4875, May 2007, available from the IETF, the content of which is incorporated by reference in its entirety as though fully set forth herein. Additional discussion of RSVP-TE may be found in D. Awduche, et al., "RSVP-TE: Extensions to RSVP for LSP Tunnels," RFC 3209, December 2001, available from the IETF, the content of which is incorporated by reference in its entirety as though fully set forth herein.

After calculating an alternate branch path, ingress router 210 may facilitate creation of the alternate branch path by signaling the alternate branch path. In the example shown in FIG. 5, ingress router 210 may, in communication with egress router 230, signal the following alternate branch path instances:

S2L sub-LSP-E': A, D, C, E; Branch-ID 5
S2L sub-LSP-F': A, D, C, F; Branch-ID 6
S2L sub-LSP-G': A, D, C, G; Branch-ID 7

Ingress router 210 may signal alternate branch paths using any suitable protocol and/or messaging process. For example, ingress router 210 may send a path setup message (e.g., a "Path" message) downstream, and in response egress router 230 may send an upstream reservation message (e.g., a "Resv" message) that triggers MPLS label allocation and completion of path setup upon reaching ingress router 210. Merge-point router 220 (e.g., node C in FIGS. 4-6) may respond to one or more path creation signals by establishing a new alternate path as a backup path in an RPF data structure (e.g., by replacing an interface with a wildcard interface) such that the alternate-branch path is merged with the initial branch path.

Any type of path signaling object may be used to create an alternate branch path. For example, an alternate branch path may be signaled with explicit route objects (EROS) with loose hop and/or strict hop instructions. A discussion of EROs and other signaling options for P2MP LSPs may be found in S. Yasukawa, "Signaling Requirements for Point-to-Multipoint Traffic-Engineered MPLS Label Switched Paths (LSPs)," RFC 4461, April 2006, available from the IETF, the content of which is incorporated by reference in its entirety as though fully set forth herein.

Once an alternate branch path has been signaled, one or more of the systems or apparatuses described herein may transmit data via the alternate branch path (step 306). For example, ingress router 210 may transmit data via one or more of alternate branch paths S2L sub-LSP-E', S2L sub-LSP-F', and S2L sub-LSP-G' while data is still being transmitted via one or more of initial branch paths S2L sub-LSP-E, S2L sub-LSP-F, and S2L sub-LSP-G. As a result, in the example illustrated in FIG. 5, data from both the failover route and from the alternate branch path instances may arrive at node C, which may drop the data from the alternate branch instances and may forward the data from the failover route (i.e., the data being transmitted via the initial, failed-over branch instances).

Returning to FIG. 3, at step 308 one or more of the systems or apparatuses described herein may instruct a merge-point device to forward data from an alternate branch path rather than forwarding data from a failover route. In the examples illustrated in FIG. 5, node A (e.g., ingress router 210 in FIG. 2) may instruct node C (e.g., merge-point router 220 in FIG. 2) to switchover from forwarding data from the failover route to forwarding data from alternate branch path instances S2L sub-LSP-E', S2L sub-LSP-F', and S2L sub-LSP-G'.

The systems described herein may instruct a merge-point device to switchover to forwarding data from an alternate branch path in a variety of ways. As noted, a label-edge device, such as an ingress device, may signal a merge-point router to switchover to forwarding data from an alternate branch path. Any other node and/or device within a network may also instruct a merge-point device to switchover to forwarding data from an alternate branch path. Alternatively, the data that a merge-point device receives via an alternate branch path may serve as an implicit instruction to switch over to forwarding data from the alternate branch path. In this example, the merge-point device may automatically switchover in when it begins receiving data from the alternate branch path, with the receipt of data functioning as the switchover instruction.

In some examples, the systems described herein may direct a merge-point device to forward data from an alternate branch path rather than forwarding data from a failover route using RSVP signaling. A merge-point device may also be instructed to switchover to forwarding data from an alternate branch path using any other suitable protocol or algorithm.

A merge-point device may switchover to forwarding data from a single branch path and/or from multiple branch paths (e.g., each branch path affected by a topology-change event) in a single operation. As a result, alternate branch paths may be used in place of initial branch paths that were affected by a topology change event, but traffic may continue to flow over original paths for any branch paths that were not affected by the topology-change event.

Once traffic is flowing via the alternate branch path or paths, an ingress device (e.g., node A in FIG. 5) or any other device or node may initiate graceful teardown of instances of the original branch path or paths. For example, ingress node A may send a Path message with Admin Status ("Deletion in Progress" flag set) for each initial branch path that failed over. In response, one or more egress devices, such as egress nodes E, F, and/or G, may trigger removal of the initial branch paths in the upstream direction. For example, egress nodes E, F, and G may send Path-Error messages upstream with a Path-State-Removed flag set in an ERROR_SPEC object, which may result in the removal of branch paths S2L sub-LSP-E, S2L sub-LSP-F, and S2L sub-LSP-G from the P2MP tree. When an initial S2L sub-LSP is deleted, a merge-point device may also delete or modify an RPF nexthop data structure (e.g., a wildcard interface) that enabled the switchover from the initial S2L sub-LSP to the alternate S2L sub-LSP. As a result of removing the initial S2L sub-LSPs, the P2MP LSP tree of FIGS. 4-6 may include the following branches (as shown in FIG. 6):

S2L sub-LSP-H: A, D, H; Branch-ID 4
S2L sub-LSP-E': A, D, C, E; Branch-ID 5
S2L sub-LSP-F': A, D, C, F; Branch-ID 6
S2L sub-LSP-G': A, D, C, G; Branch-ID 7

Thus, the systems described herein may repair and/or reconfigure a P2MP LSP tree by re-optimizing and re-signaling branch paths that are affected by a failure or other event while leaving other branch paths of the P2MP LSP tree intact. For example, the systems described herein may re-optimize some branch paths of a P2MP LSP tree while refraining from changing one or more other branch paths of the P2MP LSP tree, thereby avoiding a costly global repair operation that may involve re-signaling every branch of the P2MP tree. As a result, the systems of this disclosure may enable efficient and effective repair of P2MP LSP trees, may facilitate use of auto-bandwidth adjustments and secondary paths with P2MP LSP trees, and may provide various additional or alternative features and advantages.

Figure 7:
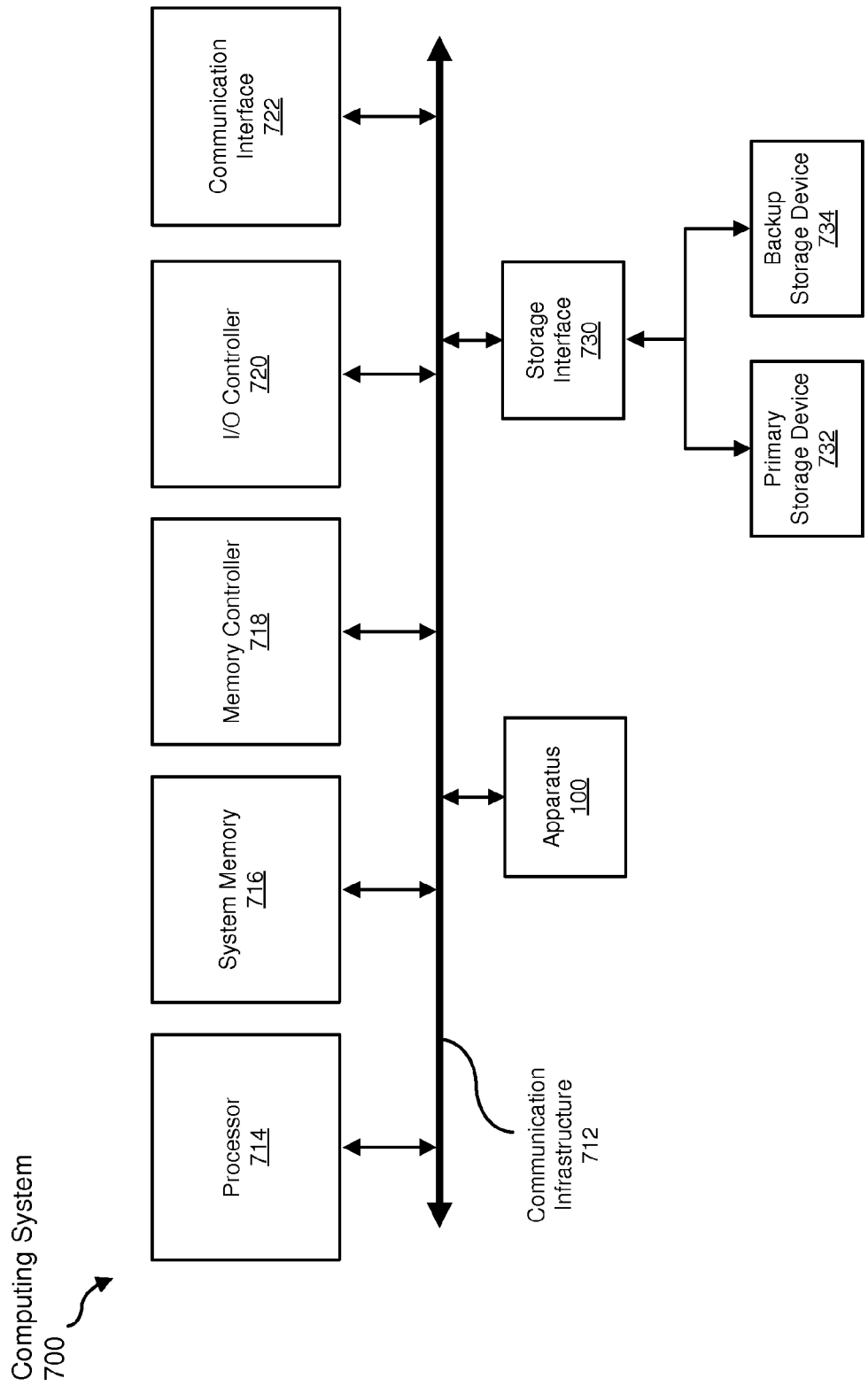
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include apparatus 100 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, an MPLS protocol, and/or any other suitable protocol.

Computing system 700 may include various network and/or or computing components. For example, computing system 700 may include at least one hardware processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose hardware processor, and/or any other suitable processing element.

Processor 714 may process data according to one or more of the networking protocols discussed above. For example, processor 714 may execute or implement a portion of a protocol stack, may process packets, may forward packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments, methods, and/or processes disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may transform a network by recalculating and re-signaling branches of P2MP LSP trees. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   detecting that at least a portion of an initial branch path of a point-to-multipoint label-switched path has failed over to a failover route that rejoins the initial branch path at a merge-point device;
   establishing an alternate branch path that merges with the initial branch path at the merge-point device;
   transmitting data via the alternate branch path while data is still being input into the initial branch path and transmitted to the merge-point device via the failover route; and
   instructing the merge-point device to forward data from the alternate branch path rather than from the failover route.

2. The method of claim 1, wherein establishing the alternate branch path comprises:
   calculating the alternate branch path; and
   signaling the alternate branch path such that the merge-point device merges the alternate branch path with the initial branch path.

3. The method of claim 2, wherein calculating the alternate branch path comprises calculating a re-optimized path based on one or more traffic-engineering parameters.

4. The method of claim 1, further comprising, after the merge-point device begins forwarding data from the alternate branch path, initiating teardown of instances of the initial branch path.

5. The method of claim 1, further comprising performing the detecting, establishing, transmitting, and instructing steps for each of a plurality of branch paths of the point-to-multipoint label-switched path that have failed over to the failover route, the plurality of branch paths comprising the initial path.

6. The method of claim 1, further comprising refraining from changing at least one branch path of the point-to-multipoint label-switched path that did not fail over to the failover route.

7. The method of claim 1, wherein directing the merge-point device to forward data from the alternate branch path rather than from the failover route is performed via resource reservation protocol signaling.

8. The method of claim 1, wherein establishing the alternate branch path comprises initiating the alternate branch path using a strict explicit route path object.

9. An apparatus comprising:
   a processor;
   a control plane that directs the processor to:
      detect that at least a portion of an initial branch path of a point-to-multipoint label-switched path has failed over to a failover route that rejoins the initial branch path at a merge-point device, and
      establish an alternate branch path that merges with the initial branch path at the merge-point device;

a network interface; and a data plane that uses the network interface to transmit data via the alternate branch path while data is still being input into the initial branch path and transmitted to the merge-point device via the failover route, wherein after the data plane begins transmitting data via the alternate branch path, the control plane instructs the merge-point device to forward data from the alternate branch path rather than from the failover route.

10. The apparatus of claim 9, wherein the processor, the control plane, and the data plane comprise an ingress router of a multi-protocol layer-switched network.

11. The apparatus of claim 10, wherein, after the merge-point device begins forwarding data from the alternate branch path, the ingress router initiates teardown of the initial branch path.

12. The apparatus of claim 10, wherein the control plane establishes the alternate branch path by:

calculating the alternate branch path; and signaling the alternate branch path such that the merge-point device merges the alternate branch path with the initial branch path.

13. The apparatus of claim 12, wherein the control plane calculates the alternate branch path by calculating a re-optimized path based on one or more traffic-engineering parameters.

14. The apparatus of claim 12, wherein the control plane establishes the alternate branch path via resource reservation protocol signaling.

15. The apparatus of claim 14, wherein the control plane establishes the alternate branch path by initiating the alternate branch path using a strict explicit route path object.

16. A system comprising:

a rerouting-control device comprising:

a control plane that detects at least a portion of an initial branch path of a point-to-multipoint label-switched path has failed over to a failover route that rejoins the initial branch path at a merge-point device, wherein the control plane also establishes an alternate branch path that merges with the initial branch path at the merge-point device;

a data plane that transmits data via the alternate branch path while data is still being input into the initial branch path and transmitted to the merge-point device via the failover route, wherein after the data plane begins transmitting data via the alternate branch path, the control plane sends a signal that instructs the merge-point device to forward data from the alternate branch path rather than from the failover route;

wherein the merge-point device comprises:

a control plane that receives the signal from the rerouting-control device;

a data plane that, in response to the signal from the rerouting control device, forwards data from the alternate branch path and drops data from the failover route.

17. The system of claim 16, wherein the control plane of the merge-point device handles switching from forwarding data from the failover route to forwarding data from the alternate branch path in a single, atomic operation such that no data is dropped during the switch.

18. The system of claim 17, wherein:

before the merge-point device switches to forwarding data from the alternate branch path:

a reverse-path-forwarding data structure in the merge-point device indicates that a label associated with the failover route is a primary label for which data is to be forwarded, and the reverse-path-forwarding data structure indicates that a label associated with the alternate branch path is a backup label for which data is to be dropped; and the control plane of the merge-point device, after receiving the signal to forward data from the alternate branch path, modifies the reverse-path-forwarding data structure in a single operation such that:

the reverse-path-forwarding data structure indicates that the label associated with the alternate branch path is a primary label for which data is to be forwarded, and the reverse-path-forwarding data structure indicates that the label associated with the failover route is a backup label for which data is to be dropped.

19. The system of claim 16, wherein the rerouting-control device comprises an ingress router that, after the alternate branch path has been merged with the point-to-multipoint label-switched path, sends a signal that initiates teardown of the initial branch path.

20. The system of claim 19, further comprising an egress router that receives the signal that initiates teardown and, in response to receiving the signal that initiates teardown, sends an upstream message that triggers removal of signaling state for the initial branch path.

* * * * *